United States Patent [19]
Moran

[11] Patent Number: 6,031,300
[45] Date of Patent: Feb. 29, 2000

[54] BRIDGE TAP REMOVER

[75] Inventor: James W. Moran, Marltown, N.J.

[73] Assignee: Bell Atlantic Networks Services, Inc., Arlington, Va.

[21] Appl. No.: 08/828,960

[22] Filed: Mar. 28, 1997

[51] Int. Cl.[7] .................................................. H01H 35/00
[52] U.S. Cl. ........................................... 307/119; 333/106
[58] Field of Search ..................................... 307/112, 116,
307/119, 125, 139, 30, 38; 333/100, 101,
105, 106; 379/242, 377, 380; 359/119;
200/2, 5 R, 179, 28, 51 R, 51.05

[56] References Cited

U.S. PATENT DOCUMENTS

| | | |
|---|---|---|
| 3,466,254 | 9/1969 | Deasy . |
| 3,467,792 | 9/1969 | Allison . |
| 4,276,562 | 6/1981 | Stewart et al. . |
| 4,494,138 | 1/1985 | Shimp . |
| 4,559,420 | 12/1985 | Yamada . |
| 4,578,702 | 3/1986 | Campbell, III . |
| 4,640,995 | 2/1987 | Naaijer . |
| 4,686,667 | 8/1987 | Ohnsorge ..................................... 370/4 |
| 4,885,747 | 12/1989 | Foglia . |
| 4,930,120 | 5/1990 | Baxter et al. . |
| 4,935,924 | 6/1990 | Baxter . |
| 4,959,554 | 9/1990 | Underwood, IV et al. . |
| 5,058,198 | 10/1991 | Rocci et al. ................................. 455/3 |
| 5,093,718 | 3/1992 | Hoarty et al. . |
| 5,130,793 | 7/1992 | Bordry et al. . |
| 5,187,733 | 2/1993 | Beffel et al. ............................... 379/10 |
| 5,363,432 | 11/1994 | Martin et al. . |
| 5,481,073 | 1/1996 | Singer et al. ................................ 200/1 |
| 5,505,901 | 4/1996 | Harney et al. . |
| 5,583,863 | 12/1996 | Darr, Jr. et al. . |
| 5,583,864 | 12/1996 | Lightfoot et al. . |
| 5,729,370 | 3/1998 | Bernstein et al. ....................... 359/118 |
| 5,859,895 | 1/1999 | Pomp et al. .............................. 379/29 |

*Primary Examiner*—Jeffrey Gaffin
*Assistant Examiner*—Peter Zura
*Attorney, Agent, or Firm*—McDermott, Will & Emery

[57] ABSTRACT

To eliminate interference with digital broadband service created by bridge tapped connections in local loop distribution cables, a switch is associated with each broadband customer drop cable connection in the terminals along the length of each distribution cable. In one position, a switch connects the upstream portion of a metallic circuit to the downstream portion of the circuit. The switch also may connect the metallic circuit to an associated one of the connectors. This bridge tapped connection enables use of the metallic circuit for a subscriber drop connection through a downstream terminal. In a second position, a switch connects the upstream portion of the metallic circuit only to the connector associated with the switch in the local terminal. A drop cable for broadband service runs from the connector in the local terminal to a nearby subscriber premises. In position, the wiring of the metallic circuit downstream of this terminal is disconnected, eliminating interference with broadband service transport over the circuit to the subscriber premises.

23 Claims, 5 Drawing Sheets

BRIDGE TAP REMOVER

TECHNICAL FIELD

The present invention relates to a system for selectively eliminating 'bridge tap' type connections from subscriber loop plant, to permit use of such plant facilities for broadband digital communications.

BACKGROUND ART

In recent years considerable interest has focused on development of digital video distribution systems, many of which would utilize one or another form of wireline transport of broadband signals to subscribers premises. In particular, a variety of networks have been proposed to enable local telephone companies to upgrade their networks to offer video services in competition with cable television companies.

U.S. Pat. No. 5,583,864 to Lightfoot et al. discloses several examples of such networks. The examples disclosed in that Patent include a point-to-point switched network utilizing Asymmetrical Digital Subscriber Line (ADSL) transport of switched 1.5 Mbits/s video signals from the serving end office over twisted wire pair to the customer premises equipment. In addition to these video signals, the ADSL loop from the end office switch to the customer premises carries telephone signals and upstream digital control signals relating to the video service. This ADSL network, however, does not provide enough bandwidth to offer simultaneous video services to a plurality of receivers in one subscriber premises.

Another network disclosed in the Lightfoot et al. Patent utilizes a hybrid fiber-coax network utilizing RF transport of multiplexed channel signals for broadcasting digital broadband signals from the serving end office to a number of subscriber premises connected in parallel to one segment of coax cable. The coax cable also carries two-way digital signaling channels and may carry multiplexed telephone signals. The hybrid fiber-coax network does provide the bandwidth for multiple simultaneous video sessions at each customer premises. However, installation of optical fiber and coaxial cable loop plant from end offices to large numbers of subscriber premises is prohibitively expensive, particularly if implemented by a local telephone company which cannot start from an installed base of existing coaxial cable facilities.

U.S. Pat. No. 5,583,863 to Darr et al. discloses a full service network using optical fiber transport of Asynchronous Transfer Mode (ATM) cell streams. A Host Digital Terminal (HDT), typically located at an end office, selectively switches streams containing requested programming over optical fibers to optical network units (ONUs). The ONUs in turn supply the individual streams over coaxial drop cables to customer premises equipment. The multiplexed digital bit stream transmitted over each drop cable contains selected programming for as many as three active receivers. Like the hybrid fiber-coax network, the HDT and ONU based system does provide simultaneous broadband sessions for a plurality of receivers at each premises. However, customer premises may be 900 feet or more from the nearest ONU. As a result, the coaxial cable installation all the way from the ONU to each customer premises is prohibitively expensive.

The local telephone exchange service carriers have invested very heavily in installation and maintenance of loop plant based on twisted wire copper pairs. Complete replacement of those facilities with various combinations of optical fiber and coaxial cable, while technically feasible, is not practical. Communities and home owners are very reluctant to allow such carriers to tear up streets and private properties to install new plant, and as noted, the installation of fiber and/or coaxial plant is quite expensive. The local telephone service carriers therefore have a strong incentive to utilize their existing twisted wire pair facilities and/or install new twisted wire pair facilities which are less expensive than other options outlined above.

A number of companies therefore have been developing a switched digital video (SDV) type full service network (FSN) architecture which relies more heavily on twisted pair wiring in the loop plant but provides sufficient digital broadband service to facilitate simultaneous broadband sessions for a number of terminals over the same drop cable. Although the precise transport protocols differ somewhat, the network utilizes optical fiber backbone transport, HDT based switching and optical fiber transport to ONUs similar to those disclosed in the Darr et al. Patent. The ONUs, however, multiplex downstream broadband signals into an OC-1 rate (approximately 51.84 Mbits/s) signal.

The switched digital video (SDV) implementation of the full service network (FSN) terminates optical fiber communications in an optical network unit (ONU), for example located in the basement of an apartment house or at the curb in a neighborhood. Twisted wire pair cables connect the ONU to terminals, and drop cables provide connections from the terminals to individual living units. For telephone service, the drop cable is a twisted wire pair. For digital video (broadband) services, the drop cable from the terminal to the customer premises typically is coaxial cable although some implementations may use an ADSL facility.

The telephone service is an analog telephone or ISDN type service. For broadband, however, the circuit from the ONU to the set-top terminal in the living unit carries the 51.84 Mbits/s (OC-1) rate digital signal, using carrier-less amplitude phase (CAP) modulation.

The SDV implementation of the network does allow local telephone carriers to develop a digital broadband communication system utilizing twisted wire pair plant facilities, and in some cases the carriers actually can utilize some existing loop plant. However, certain practices that telephone carriers have applied to telephone loop plant create problems effecting broadband signals carried over twisted wire pair.

In the telephone industry, twisted wire pair circuits from a central office or a subscriber line carrier unit generally are bridge-tapped along their length, to provide a line appearance in a number of different terminals located at different points along the multi-pair feeder cable. An installer can connect a subscriber's drop line to binding posts in the closest terminal, but the line appearance remains in other terminals connected to the multi-pair cable. At a later date, an installer can disconnect the first subscriber drop line from the one terminal, and connect a new subscriber's drop line from another terminal, in order to reuse the twisted wire pair connection through the feeder cable back to the central office for another subscriber.

In the full service network, some twisted wire pair circuits from the ONUs carry normal telephone services and can tolerate bridge taps. However, some of the twisted wire pair circuits from the ONUs carry broadband digital services using CAP modulation, and those services can not tolerate bridge tapping. The presence of bridge tapping, particularly extended wiring downstream of a particular subscriber's connection to twisted wire pair in a terminal, causes considerable disruptive interference effects. For example, the extending wiring adds capacitance and resistance. The extended wiring picks up considerable electromagnetic interference from external sources and may pick up crosstalk from adjacent active pairs. All of these effects disrupt the broadband digital service on the twisted wire pair.

To provide quality broadband service, it is necessary to keep the signal between the ONU and the customer premises as clean as possible. Accordingly, it is necessary to eliminate the deleterious effects of bridge tap type connections.

Today, to eliminate bridge tapping from pairs carrying digital broadband service, a splicer must manually cut the twisted wire pair to eliminate downstream taps. Subsequently, if a subscriber discontinues service from one location, the network operating company must send a splicer back to the terminal to restore the connection, if the company wants to reassign the same circuit to a new downstream customer.

Such manual bridge tap removal is labor intensive and expensive. Also, customer turnover necessitates repeated cutting and splicing operations which, over time, degrade the connectivity through the twisted wire pair. This degradation reduces the effective 'life' of the loop plant and may necessitate the expense and inconvenience of early replacement.

A need therefore exists for a simple, effective way to eliminate bridge tap type connections for twisted pair wiring that may carry digital broadband services. The bridge tap removal should not require manual splicing operations, and repeated connection changes should not degrade connectivity through the twisted pair cable. Also, because of the large number of terminations required to service a large subscriber base, any mechanisms used to facilitate bridge tap removal must be relatively inexpensive per unit.

DISCLOSURE OF THE INVENTION

The present invention addresses the above stated needs and overcomes the above discussed problems by providing a multi-position switch at each tap or connection to a metallic circuit of a local loop distribution cable. In a terminal providing connections to many such circuits, there are switches for at least those circuits assigned to carry broadband digital signals. In one position, the switch connects the leg of the circuit going upstream toward the headend to the leg of the circuit going downstream from the terminal. In the preferred embodiment, this is a bridge tapped type connection which also couples the associated drop cable connector to the upstream circuit leg. In another position, the switch eliminates or removes the bridge tap. That is to say, in this position, the switch provides a local connection only. The switch connects the drop cable connector to the upstream circuit leg and disconnects the leg of the circuit that is downstream of the terminal. As a result, the downstream wiring does not produce any interference with broadband signals carried on the drop cable to the subscriber premises.

In one aspect, the present invention relates to a terminal incorporating the connectors and associated switches. In another aspect, the invention relates to a connector, per se, which actually incorporates the bridge tap remover switch. Other aspects of the invention relate to a local loop distribution network and to a full service network incorporating the terminals with connectors and switches for bridge tap removal.

In the simplest form, the bridge tap remover switch is a manually operated mechanical switch. With such an implementation, an installer goes to the terminal and connects a drop cable to the binding posts for the twisted wire pair assigned to a new customer's video service. After connecting the subscriber's drop cable, the installer simply actuates the switch to the position in which it disconnects the downstream wiring.

If the customer discontinues service and the network operating company wants to reuse the circuit, the installer goes back to the terminal, disconnects the drop cable, and repositions the switch to a tapped position reconnecting the downstream cable. The installer then goes to an appropriately located downstream terminal, connects a drop cable to the binding posts for the twisted wire pair assigned, and actuates the switch in that terminal to disconnect any further downstream wiring. In this manner, the network operating company can easily reuse twisted pairs for broadband services, without any physical cutting or splicing of cables to eliminate taps or reinstate taps.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 3A and 3B illustrate the switch in the tapped or 'telephone' position, whereas FIGS. 4A and 4B illustrate the switch actuated to a broadband or 'video' position, to remove bridge tap.

BEST MODE FOR CARRYING OUT THE INVENTION

The present invention encompasses techniques for eliminating bridge taps and attendant problems from metallic circuits in loop plant wiring, in broadband digital signal distribution networks. The invention utilizes switches, as bridge tap removers, in association with line or drop connectors. The bridge tap remover of the present invention may be used in a variety of different network architectures, such as those described in the Background section above. The various network architectures may transport broadband signals over ADSL twisted wire pair circuits, coaxial cable or other types of metallic circuits in the loop plant wiring.

The presently preferred implementation, however, provides the bridge tap remover in multi-pair terminals of a switched digital video (SDV) type full service network. This network provides both digital broadband services and digital telephone services at least partially over twisted wire pair. To understand the invention it therefore may be helpful to begin with a high level discussion of the presently preferred SDV network.

Figure 1:
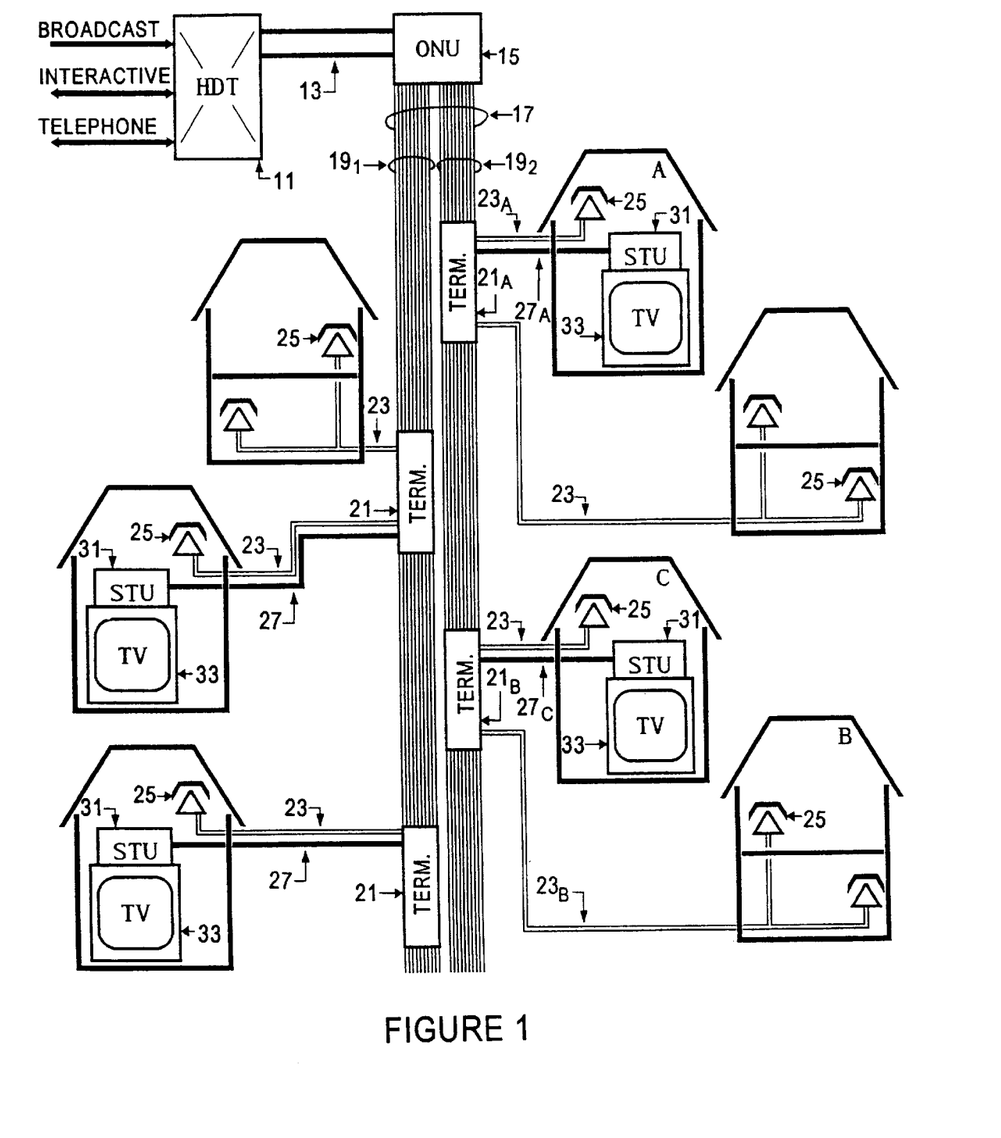
FIG. 1 is a simplified block diagram of a switched digital video (SDV) network utilizing loop plant terminals incorporating the bridge tap remover in accord with the present invention.

FIG. 1 provides a block diagram illustration of a segment of an SDV network utilizing twisted pair distribution wiring for telephone and broadband services. A summary description of the network is followed by a more detailed description of the local loop facilities of the network, after which there will be a discussion of the terminals incorporating the bridge tap remover.

As shown in FIG. 1, a host digital terminal (HDT) 11 serves as the end office switching point for broadband services. The HDT 11 receives digital video broadcast service signals, for example, for five hundred channels or so, over one or more optical fibers. The HDT 11 also connects over one or more fibers for two-way communication through an asynchronous transfer mode (ATM) switch (not shown). The two-way connection and the ATM switch provide transport for two-way interactive communications between gateway and server systems operated interactive information service providers and subscribers broadband customer premises equipment.

Downstream from the HDT, each premises in which a customer subscribers to broadband network services has assigned an OC-1 rate channel for transporting signals for digital broadband and data services to that premises. The HDT 11 switches and multiplexes selected broadcast signals together with downstream signals for interactive sessions into each OC-1 assigned to a particular customer premises. For example, several receivers, referred to as subscriber terminal units (STUs) 31, at one premises may request different broadcast video programs. The HDT 11 aggregates the signals or those programs into the assigned OC-1. Each STU 31 decodes the appropriate signals from the OC-1 and presents the selected programs on the respective TV set 33.

The HDT 11 also passes digital telephone signals to and from a telephone type central office switch (not shown). Each telephone channel has a logical line appearance at the central office switch, in a manner analogous to circuits transported through a subscriber line carrier system, and the switch performs all incoming and outgoing telephone call routing.

Two or more optical fibers 13 connect the HDT 11 to each of a number of optical network units (ONUs). Each ONU serves as the headend of the local loop distribution plant. FIG. 1 shows only one such ONU 15, for simplicity. The optical fibers 13 to each ONU 15 provide downstream transport for thirty-two OC-1 rate signals for broadband services and data services. The fibers 13 also provide two-way digital signaling communications related to program selections and interactive broadband services as well as two-way data services. The fibers 13 also carry two T1 rate digital telephone circuits, which together provide forty-eight D0 channels for individual voice grade telephone communications.

An ONU 15 performs two-way conversions between the optical signals and electrical signals. The ONU 15 also performs multiplexing and demultiplexing functions. For example, in the downstream direction, the ONU separates out each OC-1 signal received over the fibers 13 and couples each OC-1 signal to a twisted wire pair assigned to carry that signal to a particular subscriber premises. In the upstream direction, the ONU receives various data and signaling messages from the STUs 31. The ONU also provides the appropriate telephone line interfaces for telephone service and provides conversions and multiplexing/demultiplexing functions to couple individual telephone circuits to the T1s and provide two-way T1 communications over the fibers 13.

Consider now the local loop distribution plant between the ONUs and the customer premises.

The metallic circuits from the ONU 15 utilize 100 pair copper cables 17 which may extend up to 900 feet from an ONU 15. Within that range, there will typically be twelve to fourteen customers, although in the present configuration, each ONU may provide broadband digital service to up to thirty-two homes. The ONU 15 provides telephone service to those same homes, and some of the homes will have multiple telephone line services.

For telephone services, the ONU 15 handles forty-eight D0s. The optical fibers 13 between the ONU 15 and the HDT 11 carry two T1 channels for multiplexed transport of the Do voice grade telephone channels. The ONU can associate each Do with analog service over one twisted wire pair, thus the ONU utilizes up to forty-eight pairs in the cable 17 for telephone service. The telephone service is typically analog, but the ONU can also provide ISDN service (2B channels plus 1D channel) over any of the pairs allocated for telephone service.

The ONU 15 also handles one OC-1 rate signal stream for each home or customer premises that the ONU serves. For this purpose, the current implementation of the ONU includes up to four video transmit and receive (VTR) cards. Each VTR card connects to up to eight metallic circuits in the distribution cable. The VTR card supplies an OC-1 signal for broadband services downstream over the circuit and receives any upstream digital communications, e.g., signaling messages from subscriber terminal units (STUs) 31 coupled to the broadband circuit within the customer premises. Thus, the ONU 15 may transmit up to thirty-two OC-1 signals. From the ONU downstream, each OC-1 digital broadband signal rides on a separate twisted pair in the distribution cable 17. Typically, each such pair is assigned to provide broadband services to one subscriber premises, although if subscribers desire additional services, one subscriber could have multiple broadband pairs and multiple OC-1 broadband transport channels.

Within the 100 pair distribution cable 17, the first 50 pairs are designated for telephone service, and the next 32 pairs are designated for digital broadband (video) service. The remaining 18 pairs are available as spares.

Out of any one ONU 15, groups 19 comprising forty or more pairs run together through a series of terminals 21. Typically, an ONU connects to two lateral runs or branches 19₁, 19₂ comprising fifty pairs, of which forty currently connect to the terminals on the respective branch. If 100 pair cables are used, both branches 19₁, 19₂ run along the same route, but different sets of terminals 21 connect to the two branches at various points along the cable route. If 50 pair cables are used, the two branches 19₁, 19₂ may run in different directions.

Along the length of each of the cable branches $19_1$, $19_2$, there are a number of the multi-connector terminals 21. Each terminal 21 provides connections for up to forty of the pairs in the cable 17. Typically, there are one to eight terminals 21 on any lateral run or branch out from an ONU 15.

Within each terminal 21, twenty-four pairs are available for telephone service, and sixteen pairs are available for broadband service. The same forty pairs, however, connect in a similar fashion to a number of the terminals 21 along the length of the respective branch $19_1$ or $19_2$ of the distribution cable 17. As such, those pairs have an 'appearance' in each of the connected terminals 21. Other terminals along the cable provide similar multi-appearance connections to at least another forty of the pairs in the other branch of the distribution cable 17.

If the cable 17 runs along telephone poles, the terminals 21 would be housed and configured as aerial terminals, supported by the poles and/or the cables between the poles. Alternatively, the terminals may be housed in pedestals on the ground, if the multi-pair cables 17 or 19 and the subscriber drop cables run underground.

For each telephone line service to a customer premises, one of the terminals 21 provides a connection of a twisted wire pair drop cable 23 to an assigned one of the pairs within the distribution cable 17. At each customer premises, the twisted wire pair drop cable 23 connects through a network interface device (not shown) and customer premises wiring to one or more telephone devices 25.

For each broadband service to a customer premises, one of the terminals 21 provides a connection of a balun (not shown) and coaxial cable 27 to an assigned one of the pairs within the distribution cable 17. At each customer premises, the coaxial drop cable 27 connects to one or more subscriber terminal units (STUs) 31. An STU 31 typically comprises a network interface module for communications interface to the network and a digital entertainment terminal for providing the user interface and for decoding received information and providing a display output through the associated television set 33.

As noted, several terminals 21 connect to the twisted wire pairs in each branch $19_1$ or $19_2$ of the distribution cable 17 from one ONU 15. For pairs carrying telephone services, the terminals 21 preferably provide bridge tapped connections. These connections facilitate reuse according to telephone industry practices. For example, assume initially that a designated pair connects through terminal $21_A$ to the drop $23_A$ going to customer premises A. If that subscriber discontinues telephone service, an installer disconnects the drop $23_A$ from that pair within terminal $21_A$. At a later time, the carrier can reuse the pair to provide service through the same or a different terminal 21. For example, if the customer at premises B later subscribes to telephone service, and the pair in cable 17 is still available, the network operating company can assign that pair to the new customer at premises B. An installer now connects the drop cable $23_B$ to the pair within terminal $21_B$.

In accord with the present invention, the terminals 21 incorporate a bridge tap remover switch in at least the metallic circuits allocated to broadband services. In one position, the switch connects the pair through the terminal 21 to the portion of the pair downstream from the terminal. In the first position, a connection can be made to the pair through a terminal further downstream. In the other position, the switch 21 disconnects the downstream wiring and provides a connection to associated binding posts. A balun and coaxial drop cable 27 connect from the binding posts to digital broadband customer premises equipment.

Assume, for example, that initially a designated pair connects through terminal $21_A$ to the coaxial drop $27_A$ going to customer premises A. Within that terminal, the switch associated with the pair is in a 'video' service position in which the switch disconnects the pair wiring downstream from the terminal $21_A$. Thus, the portion of the assigned pair running from terminal $21_A$ to terminal $27_B$ and any wiring downstream of terminal $27_B$ is disconnected from the portion of the assigned pair that runs from the terminal $21_A$ to the ONU 15. The disconnected wiring can not disrupt broadband services to the customer premises A.

If the customer at premises A discontinues broadband service, an installer disconnects the coaxial drop $27_A$ from that pair within terminal $21_A$. At a later time, the carrier can reuse the pair to provide service through the same or a different terminal 21. For example, if the customer at premises C later subscribes to broadband service, and the pair in cable 17 is still available, the network operating company can assign that pair to the new customer at premises C. An installer goes back to the terminal $21_A$ and repositions the switch to a tapped position reconnecting the downstream portion of the assigned pair.

The installer then goes to the downstream terminal $27_B$ that will serve the new customer premises C. At that terminal, the installer connects a balun and a coaxial drop cable $27_C$ to the binding posts for the twisted wire pair assigned, and actuates the switch in the terminal $27_B$ to disconnect any further downstream wiring. The twisted pair provides connectivity down to the appropriate terminal $27_B$, but the portion of the pair further downstream from that terminal is disconnected so as to avoid any interference with broadband service to customer premises B.

If a downstream customer discontinues service and a pair is assigned to a new customer serviced through a terminal further upstream, the switch eliminates the bridge tap and all downstream wiring without the need to even disconnect the drop cable from the downstream terminal to the old customer's premises. In our example, assume now that the customer at premises C discontinues broadband service, and a new resident at premises A subscribes to broadband service. The installer goes to terminal $21_A$ and moves the switch to the 'video' position. The portion of the assigned pair running from terminal $21_A$ to terminal $27_B$ and all wiring downstream of terminal $27_B$ is disconnected, including the drop cable $27_C$. The installer need not remove the drop cable $27_C$. The disconnected wiring can not disrupt broadband services to the customer premises A.

As shown by the above example, circuit reuse does not require cutting and splicing of the metallic circuits. This reduces labor costs and extends the service life of the twisted wire cable plant.

For simplicity, the illustrated branches $19_1$ and $19_2$ do not have any shared pairs. In actual installations, different branches may have some overlap of the pairs forming the respective metallic circuits, particularly for telephone related services. Such sharing of pairs enables one hundred pair distribution cable 17 to support more than two branches 19. For any given pair however, the terminals are at different points along the cable, and if used for broadband services, the terminals incorporate the switches to remove bridge taps.

It may be helpful at this point to consider a specific example of a terminal 21 incorporating bridge tap removers in accord with the present invention.

Figure 2:
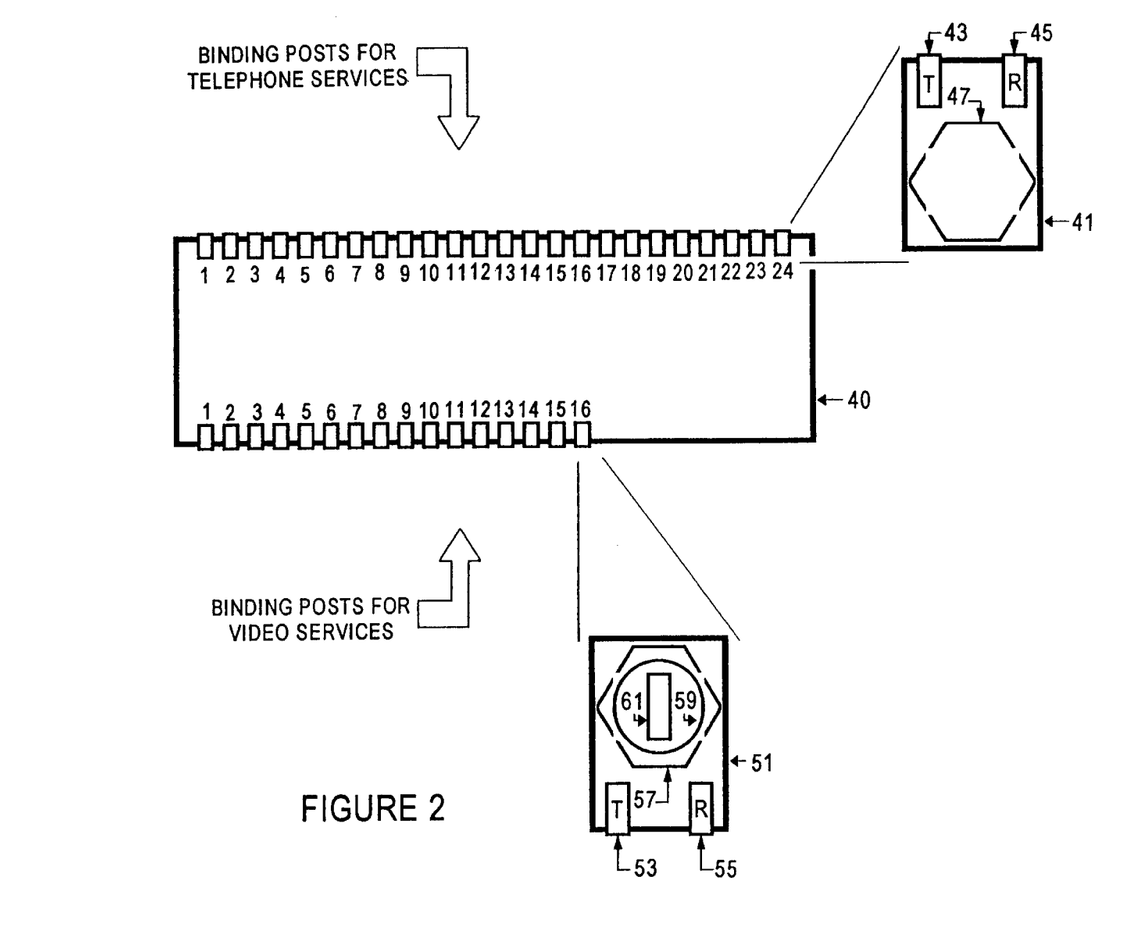
FIG. 2 is a schematic representation of a forty-pair connecting terminal with enlargements of two of the connectors, one of which incorporates a bridge tap remover switch.

FIG. 2 is a schematic illustration of the board 40 and connectors from inside one of the terminals 21. The terminal 21 includes connectors for forty twisted wire pairs. In accord with the present invention, at least those connectors assigned for broadband services have bridge tap remover switches associated therewith. Although all of the connectors may have switches, to reduce cost the preferred embodiment includes bridge tap remover switches only in association with those connectors used for cable pairs assigned to carry digital broadband services.

In the illustrated embodiment, twenty-four connectors 41 located along the top edge of the board 40 are available for connection to pairs assigned to telephone services. Sixteen connectors 51 shown along the bottom of the board provide connections for pairs available for broadband or 'video' services. The arrangement of the connectors 41, 51 around the board is a simple example only, and a wide variety of alternate arrangements of the two groups of connectors is possible.

Within a terminal, each of forty twisted wire pairs from the multi-pair cable connect to a separate connector 41 or 51. The pairs in the cable branch 19 preferably connect to the connectors 41, 51 via cable splices behind the board 40 which are not visible in the drawing, although other connection arrangements are possible.

FIG. 2 also shows enlarged views of one of the telephone service connectors 41 and one of the 'video' service connectors 51.

The telephone service connector 41 preferably is an insulation displacement connection (IDC) type connector. For connection of the drop cable wiring, the post 41 includes two binding posts 43, 45. The installer inserts the ends of the tip (T) and ring (R) wires of a drop cable pair 23 into the binding posts and tightens down a hexagonal nut 47 (or other similar tightening mechanism). The tightening of the nut tightens the binding posts on the wires. Blades incorporated within the binding posts cut though the insulation and make connection to the copper wiring.

The 'video' service post 51 preferably is an IDC type connector. For connection of the drop cable wiring, the connector 51 includes two binding posts 53, 55. The installer inserts the ends of the two wire leads of a balun into the T and R binding posts 53, 55 and tightens down a hexagonal nut 57 (or the like). The tightening of the nut tightens the binding posts on the wires. The blades in the binding posts cut though the insulation and make connection to the copper wiring of the balun. The installer then connects a coaxial drop cable 27 to the balun leads.

In accord with the presently preferred embodiment of the invention, the IDC connector 51 for the video services also incorporates a two-position rotary switch serving as the bridge tap remover. The switch may be incorporated in any practical manner that provides a simple compact structure yet offers easy access to the switch for activation. In the illustrated implementation, the hexagonal nut has a central opening 59. An installer inserts a screwdriver or the like through the opening and into a slot 61 in the switch, to actuate the switch to either of its two alternate positions.

In one position, the switch connects the twisted pair from the distribution cable 17 to the downstream portion of the pair and preferably provides a tap to the binding posts 53, 55. In this position, the switch provides a bridge tap, in a manner analogous to that used today in telephone circuits. When used for a drop connection, the installer turns the switch to the other position. In this position, the switch disconnects the downstream wiring, eliminating the bridge tap connection.

A variety of switch structures can be used as the bridge tap remover switches. Examples include slide switches and push-pull switches, two-position switches and three-position switches. The switches may be electronic switches, although the currently preferred embodiment utilizes mechanical switches. The switches may be incorporated directly into the connectors as suggested in FIG. 2, or the switches may be mounted alongside the connectors 51. If incorporated in the connector 51, the switch may be designed for actuation through the nut as shown, or for actuation from below or for actuation by movement of some lever extending out adjacent the nut.

Figure 3A:
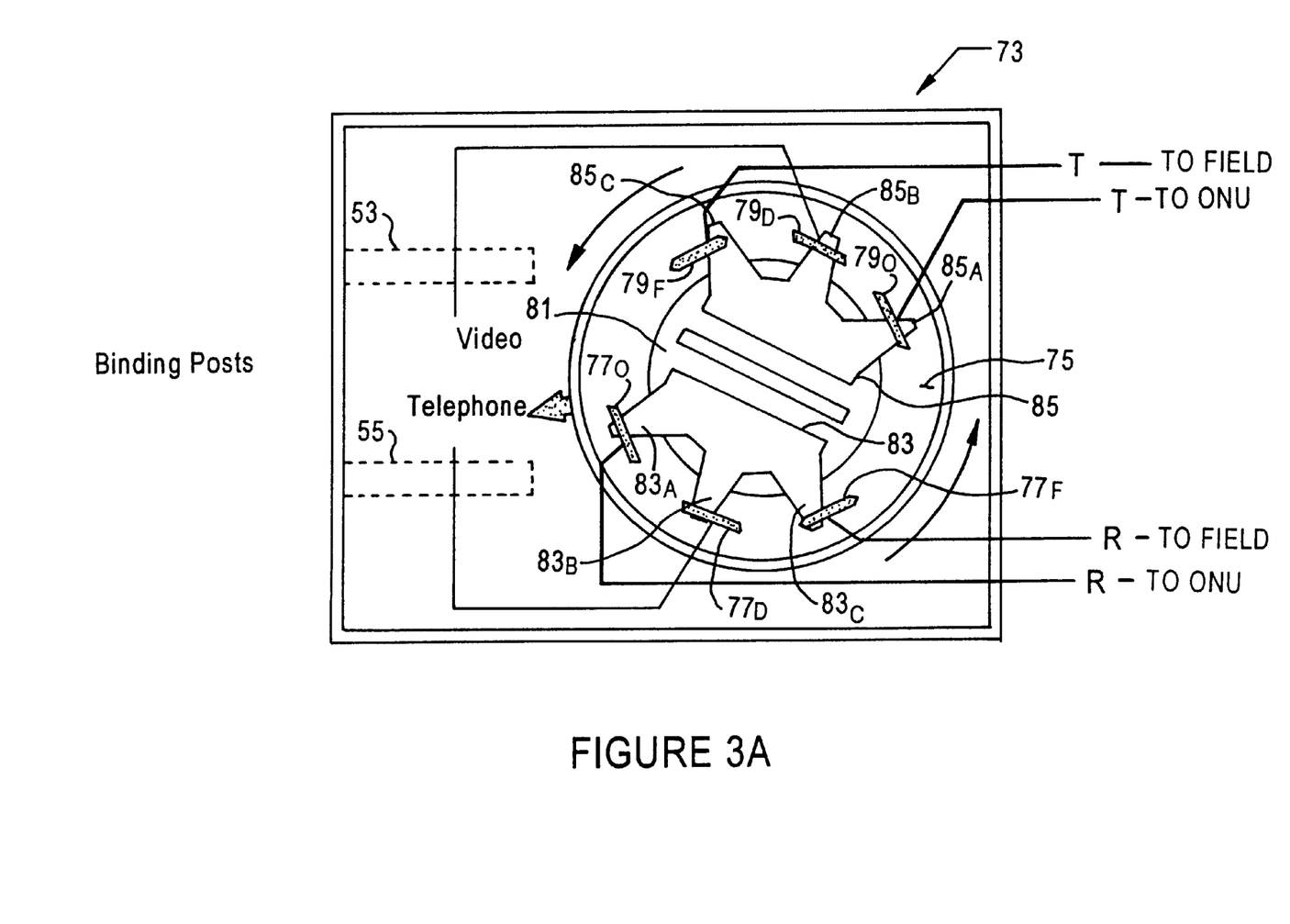
FIGS. 3A and 4A illustrate a preferred rotary switch structure for a bridge tap remover switch in two different positions.
Figure 4A:
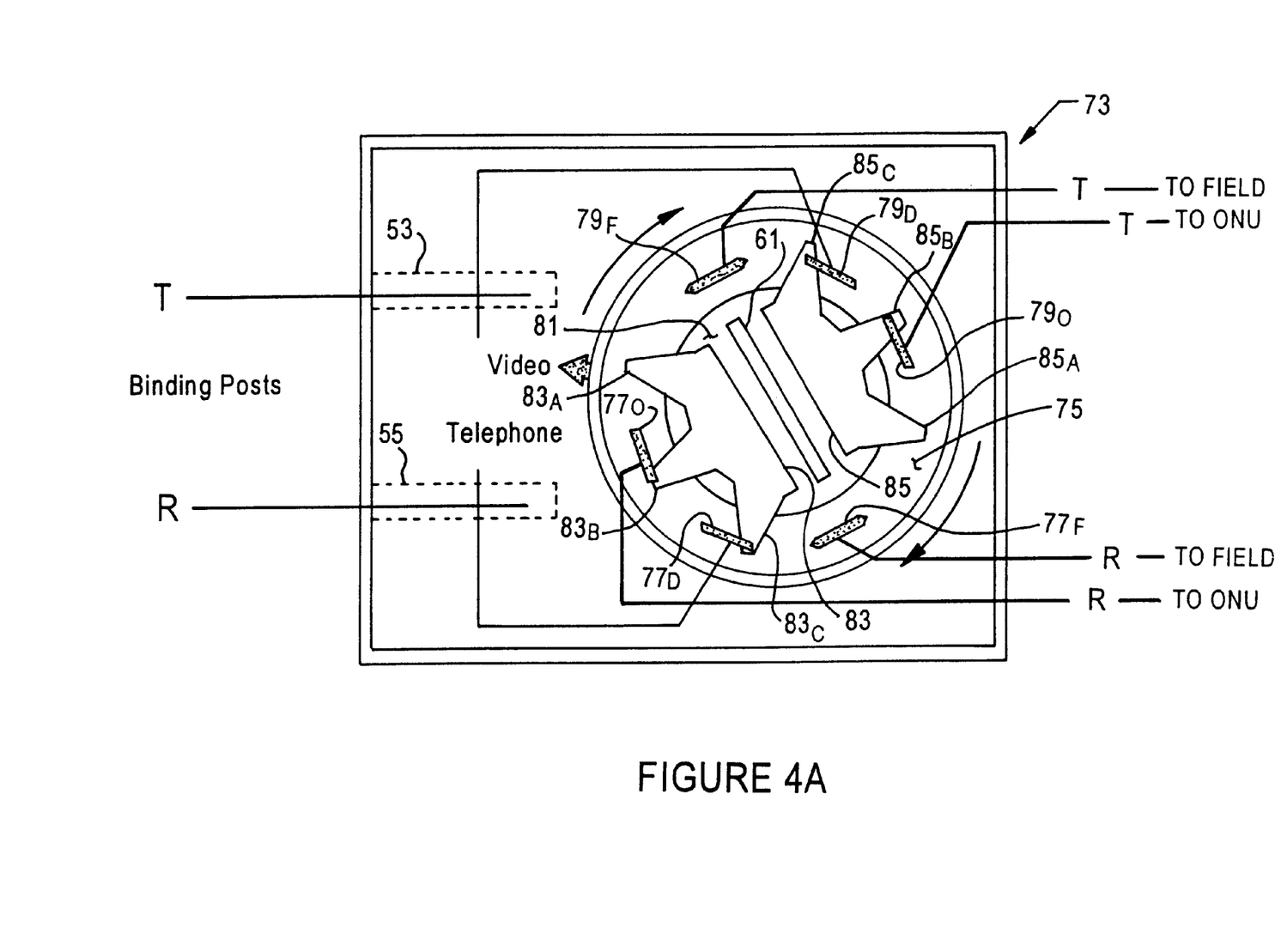

FIGS. 3A and 4A depict an example of a two-position rotary switch type Bridge Tap Remover 73, which preferably is incorporated into the 'video' service connectors 51. The switch 73 may be accessible through the hex nut as discussed above, or the switch 73 may be constructed for actuation from the opposite side of the terminal board 40, or the switch may be actuable by motion of a lever or the pointer arrow associated with the switch rotor.

The two-position rotary switch 73 includes a fixed plate which forms a stator 75. The stator 75 is made of an insulating material. The stator 75 supports six fixed or stationary contacts. Three of the stationary contacts 77 provide connections to various ring leads (R). Three of the stationary contacts 79 provide connections to various tip leads (T).

The middle contacts $77_D/79_D$ are connected to the binding posts 53, 55. More specifically, the middle stationary contact ring contact $77_D$ connects to the ring (R) binding post 55. The binding post 55 allows connection of the ring (R) lead of a subscriber's drop cable. The middle contact $79^D$ connects to the tip (T) binding post 53. The binding post 53 allows connection of the ring (R) lead of a subscriber's drop cable. A subscriber's drop cable may connect to these binding posts as shown in FIG. 4A. For broadband or 'video' services, the drop cable is a coaxial cable and connects to the binding posts 53, 55 via a balun.

Stationary contacts $77_O$ and $79_O$ connect through appropriate splicing to the ring (R) and tip (T) leads going upstream to the ONU, i.e. to the upstream portion of the metallic circuit. Stationary contacts $77_F$ and $79_F$ connect through appropriate splicing to the ring (R) and tip (T) leads going downstream or to the 'field', i.e. to the downstream portion of the metallic circuit. Typically the downstream portion of the metallic circuit provides connection through one or more downstream terminals.

The switch 73 also includes a rotor 81 made of an insulating material. The rotor 81 is rotatably mounted in a circular cylindrical opening in the stator 75. The actuation slot 61 is formed in the center of the rotor 81, so that an installer may insert a screwdriver or the like to turn the rotor 81.

The insulating rotor 81 supports two metallic (conducting) contact plates 83, 85. The contact plate 83 has three outwardly extending contact arms $83_A$, $83_B$, $83_C$ which serve as the movable contacts with respect to the ring (R) connections. Depending on the position of the rotor 81 relative to the stator 75, the arms and plate 83 make different connections between the stationary ring (R) contacts 77. The contact plate 85 has three outwardly extending contact arms $85_A$, $85_B$, $85_C$ which serve as the movable contacts with respect to the tip (T) connections. Depending on the position of the rotor 81 relative to the stator 75, the arms and plate 85 make different connections between the stationary tip (T) contacts 79.

FIG. 3A shows the switch 73 in a bridge tapped position for 'telephone' like connection. If the pair is used for telephone service, actual wires could be connected to the binding posts 53, 55. However, in the preferred implementation, only the pairs assigned for digital broadband service (referred to as 'video') incorporate the switch 73. Thus, in the 'telephone' position shown in FIG. 3A, no drop cable wiring or leads connect to the binding posts 53, 55.

In the position shown in FIG. 3A, a pointer arrow moveable with the rotor 81 indicates that the switch is in the 'telephone' position. The contact arms $83_A$, $83_B$, $83_C$ physically contact the stationary ring (R) contacts $77_O$, $77_D$, $77_F$ respectively, and the body of the metal contact plate 83 provides electrical conductivity between those stationary contacts. Similarly, the contact arms $85_A$, $85_B$, $85_C$ physically contact the stationary tip (T) contacts $79_O$, $79_D$, $79_F$ respectively, and the body of the metal contact plate 85 provides electrical conductivity between those stationary contacts. As a result, the switch 73 is fully closed. The tip and ring pair from the ONU connects to both the tip and ring binding posts and to the tip and ring leads extending downstream through the field to other terminals, as shown schematically in FIG. 3B.

FIG. 4A shows the switch 73 in an untapped position for the digital broadband service. The pointer arrow indicates that the switch is in the 'video' service position. The contact arms $83_B$, $83_C$ physically contact the stationary ring (R) contacts $77_O$, $77_D$ respectively, and the body of the metal contact plate 83 provides electrical conductivity between those stationary contacts. The stationary contact $77_F$ for the ring (R) lead downstream to the field receives no contact from any portion of the plate 83. As such, the downstream ring (R) lead is disconnected.

Similarly, the contact arms $85_B$, $85_C$ physically contact the stationary tip (T) contacts $79_O$, $79_D$ respectively, and the body of the metal contact plate 85 provides electrical conductivity between those stationary contacts. The stationary contact $79_F$ for the tip (T) lead downstream to the field receives no contact from any portion of the plate 83. As such, the downstream tip (T) lead also is disconnected.

As a result, the switch 73 is open with respect to the connections to the downstream portions of the metallic circuit. The tip and ring pair from the ONU connect only to the tip and ring binding posts, as shown schematically in FIG. 3B. In this position, an installer connects the tip and ring leads of a balun to the binding posts 53, 55 and connects a coaxial cable pair from the balun to the customer premises. The customer premises receives broadband connectivity back upstream to the ONU. However, that connectivity is clear of any downstream wiring, and there is no bridge tapping in the circuit carrying the customer's broadband service.

Figure 4B:
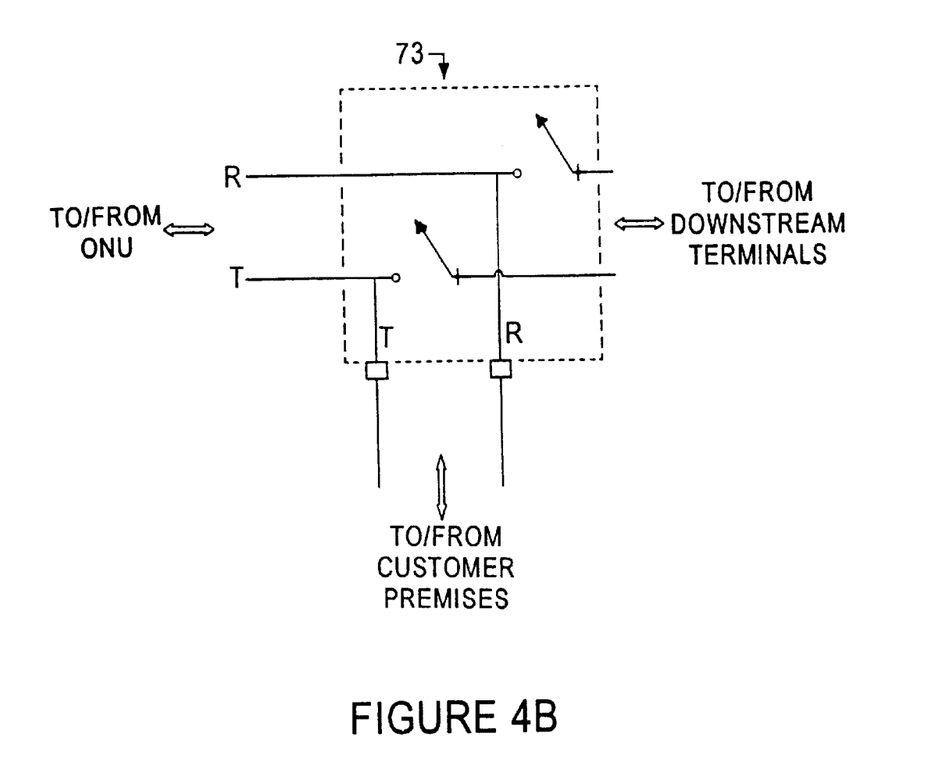

In practice, an installer goes to the terminal 21 serving the subscriber and connects a balun and coaxial drop cable 27 to the binding posts 53, 55 for the twisted wire pair assigned to a new customer's video service. For this purpose, the installer inserts two leads into the binding posts 53, 55 of the IDC connector 51 and tightens the hex nut 57 until the connector makes the electrical connection to the leads. After connecting the subscriber's drop cable to the balun, the installer simply turns the rotary switch 73 to the 'video' position, to disconnect the downstream wiring as shown in FIGS. 4A and 4B.

Figure 3B:
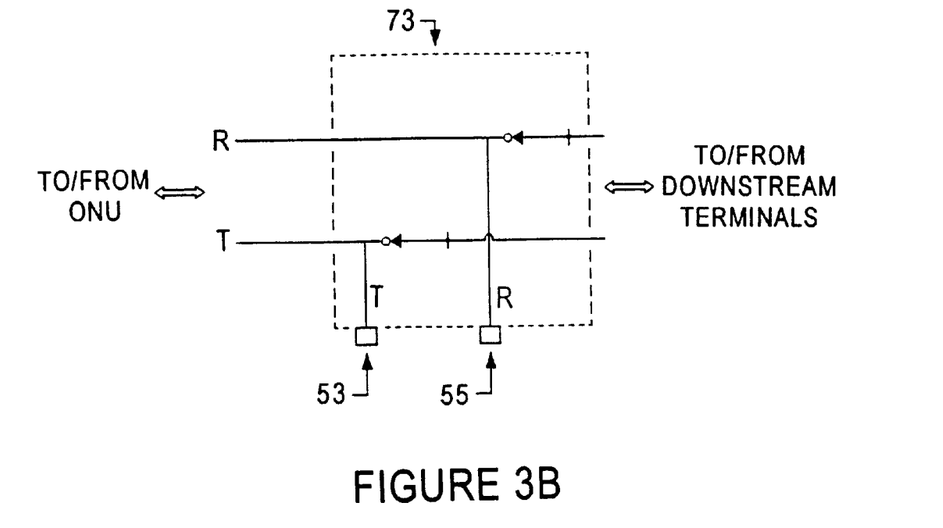
FIGS. 3B and 4B are circuit diagrams illustrating the electrical circuit through the switch in its two different positions.

If the customer discontinues service and the network operating company wants to reuse the circuit, the installer goes back to the terminal 21, disconnects the drop cable 27, and turns the switch 73 to the tapped 'telephone' position reconnecting the downstream cable in the manner shown in FIGS. 3A and 3B. The installer then goes to an appropriately located downstream terminal, connects a balun and coaxial drop cable to the binding posts for the twisted wire pair assigned, and turns the rotary switch 73 in that terminal to the 'video' position to disconnect any further downstream wiring.

In the implementation illustrated in FIGS. 3A and 4A, the two-position switch either connects both the binding posts and the downstream circuit to the upstream circuit (bridge tap), or the switch connects only the binding posts to the upstream circuit (no bridge tap). With this implementation, a terminal that is upstream of the terminal actually providing the drop line connection for the active broadband subscriber will include a switch in the bridge tap position. However, typically there is no drop line connected to the associated binding posts (see FIG. 3A). As a result, there is insufficient extra wiring tapped to the line to create appreciable interference.

If the wiring at such an upstream terminal were creating problems, the terminals would utilize one of several different switch arrangements. For example, the switch might be modified so that in one position the upstream circuit connects only to the downstream circuit portion of the cable pair. This position might be an alternative position, i.e. in a three position switch, or this position might replace the tapped ('telephone') position in the switch in a two-position switch.

Consider briefly the use of a three-position switch. This switch provides the 'telephone' (bridge tap) and 'video' (no bridge tap) connections as discussed above. The three-position switch would provide a third position or connection in which the upstream circuit connects to the downstream portion of the circuit, but the switch disconnects any local wiring to the binding posts or drop cable from the pair in the distribution cable. In such a case, the operating company might not even need to remove the drop wiring for an inactive drop, e.g., when service is cut off to one subscriber location and transferred to a subscriber accessed through another terminal further downstream.

The invention admits of a variety of modifications within the level of skill in the art. For example, in the IDC connector implementation, although shown as separately actuated by insertion of a screw driver in the slot 61, the rotor 81 could turn to the video position as the installer tightens the hex nut 57 to make the drop cable connection.

For cost reasons, the preferred implementation discussed above associates switches only with those connectors and cable pairs assigned to transport broadband services. If the added cost of the switches were acceptably low, each connector could have an associated switch. In such an implementation, all of the pairs would be available for either telephone or broadband service at each connected terminal. The installer would simply select the correct position for the switch when the pair is assigned to carry a particular service.

The initially preferred implementation of the Bridge Tap Remover utilizes a mechanical, manually operated switch, e.g., the rotary IDC switch discussed above. However, the present invention also encompasses automated, remotely controlled switching. In such an implementation, the terminals 21 would include some means responsive to a signal from a central location to open or close the switch(es) 73 performing the tapping and tap removal. The switches may still be mechanical (relays) but preferably are electronic switches. In this intelligent terminal implementation, when a customer orders service, the operating company can transmit signals to actuate the appropriate Bridge Tap Remover switch(es) to connect the subscriber's circuit through to the serving terminal 21 and disconnect any tap to wiring of the circuit downstream from that terminal.

The above discussion of the invention has concentrated on application of the Bridge Tap Remover to a network providing digital broadband services, typically for broadcast and/or interactive video. The invention, however, applies to other broadband services, such as DDS, DS1 and DS3 data transport services. The invention also applies to ADSL networks, which involve transport of broadband digital signals downstream over twisted wire pair, typically multiplexed onto the same pair as a customer's telephone service.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A loop plant terminal comprising:

a plurality of first connectors for telephone services, for coupling telephone drop cable wiring to metallic circuits of a multi-circuit distribution cable;

a plurality of second connectors for broadband services, for connection of broadband drop cable wiring; and a switch associated with each of the second connectors for: (1) connecting an upstream metallic circuit of the distribution cable to a downstream metallic circuit of the distribution cable in a first position, and (2) connecting the upstream metallic circuit to the associated second connector and disconnecting the downstream metallic circuit in a second position.

2. A terminal as in claim 1, wherein each switch comprises contacts for connecting the upstream metallic circuit to both the associated second connector and the downstream metallic circuit in the first position.

3. A terminal as in claim 1, wherein each switch comprises a rotary switch.

4. A terminal as in claim 1, wherein the second connectors comprise insulation displacement connection (IDC) type connectors.

5. A terminal as in claim 4, wherein the first connectors comprise insulation displacement connection (IDC) type connectors.

6. A terminal as in claim 4, wherein each switch is incorporated into the associated second connector.

7. A terminal as in claim 6, wherein each switch comprises a rotary switch.

8. A connector, comprising:

binding posts for connection to drop cable wiring; and a switch coupled to the binding posts, for spliced connection into a metallic circuit, for: (1) in one position connecting an upstream portion of the metallic circuit to a downstream portion of the metallic circuit, and (2) in another position connecting the upstream portion of the metallic circuit to the binding posts and disconnecting the downstream portion of the metallic circuit.

9. A connector as in claim 8, wherein the binding posts provide insulation displacement connection (IDC) type terminals for a pair of wires.

10. A connector as in claim 8, wherein the switch is a rotary switch.

11. A connector as in claim 9, wherein in the one position the switch is for connecting the upstream portion of the metallic circuit to both the downstream portion of the metallic circuit and the binding posts.

12. A local loop network for providing at least digital broadband communication signals, comprising:

a distribution cable comprising a plurality of metallic circuits;

a headend for distributing digital broadband communication signals over the metallic circuits;

a first terminal coupled to the metallic circuits of the distribution cable at a first point along the distribution cable;

the first terminal comprising: a switch coupled between an upstream portion and a downstream portion of each of the metallic circuits of the distribution cable, and a drop connector associated with each switch for coupling to a drop circuit to a customer premises; and a second terminal at a second point along the distribution cable downstream from the first point, the second terminal comprising drop connectors for coupling each one of the downstream portions of the metallic circuits of the distribution cable to a drop circuit to a customer premises, wherein:

in a first position each switch connects the upstream portion of the coupled metallic circuit to the downstream portion of the coupled metallic circuit, and in a second position the switch connects the upstream portion of the coupled metallic circuit to only the associated drop connector and disconnects the downstream portion of the coupled metallic circuit.

13. A local loop network as in claim 12, wherein the headend comprises an optical network unit interfacing optical communications of a higher level network to the metallic circuits.

14. A local loop network as in claim 12, wherein the metallic circuits comprise twisted wire pairs.

15. A local loop network as in claim 12, wherein the distribution cable further comprises a plurality of additional metallic circuits for transporting telephone service signals, and each of the terminals further comprises connectors for coupling the additional telephone circuits to telephone drop wiring to customer premises.

16. A local loop network as in claim 12, wherein each switch is a two position switch and in the first position connects the upstream portion of the coupled metallic circuit to both the downstream portion of the coupled metallic circuit and to the associated drop connector.

17. A local loop network as in claim 16, wherein each two position switch comprises a rotary switch.

18. A local loop network as in claim 17, wherein the rotary switch is integrated into the associated drop connector.

19. A local loop network as in claim 18, wherein the associated drop connectors comprise insulation displacement connection (IDC) type connectors.

20. A local loop network as in claim 12, wherein:

each drop connector in the first terminal comprises an insulation displacement connection (IDC) type connector having two binding posts and a mechanism for tightening the binding posts on leads associated with a drop cable; and each drop connector structurally incorporates one of the switches.

21. A full service network for providing telephone services and digital broadband communication services, comprising:

a host digital terminal for selectively switching broadband service signals and multiplexing the switched broadband service signals onto a plurality of optical fibers and for providing two-way telephone communications between a central office and multiplexed channels on the optical fibers;

an optical network unit terminating at least one of the optical fibers for providing conversions between optical signals and electrical signals;

a distribution cable comprising: a first group of metallic circuits assigned to transport digital broadband service signals, and a second group of metallic circuits assigned to carry two-way telephone communication signals; and a plurality of terminals coupled to the metallic circuits of the distribution cable at points spaced apart along the distribution cable, at least one of the terminals comprising: (1) a switch coupled between an upstream portion and a downstream portion of each of the metallic circuits of the first group, (2) a broadband drop connector associated with each switch for coupling to a broadband drop circuit to a customer premises, and (3) a telephone drop connector coupled to each metallic circuit of the second group for coupling to a telephone drop circuit to a customer premises; wherein:

in a first position each switch connects the upstream portion of the coupled metallic circuit to the downstream portion of the coupled metallic circuit, and in a second position the switch connects the upstream portion of the coupled metallic circuit to only the associated drop connector and disconnects the downstream portion of the coupled metallic circuit.

22. A full service network as in claim 21, wherein the metallic circuits comprise twisted wire pairs.

23. A full service network as in claim 21, wherein the digital broadband service signals comprise video signals.

* * * * *